Nov. 25, 1958
C. BECK
2,861,794
HYDRAULIC SPRINGS
Filed July 27, 1955
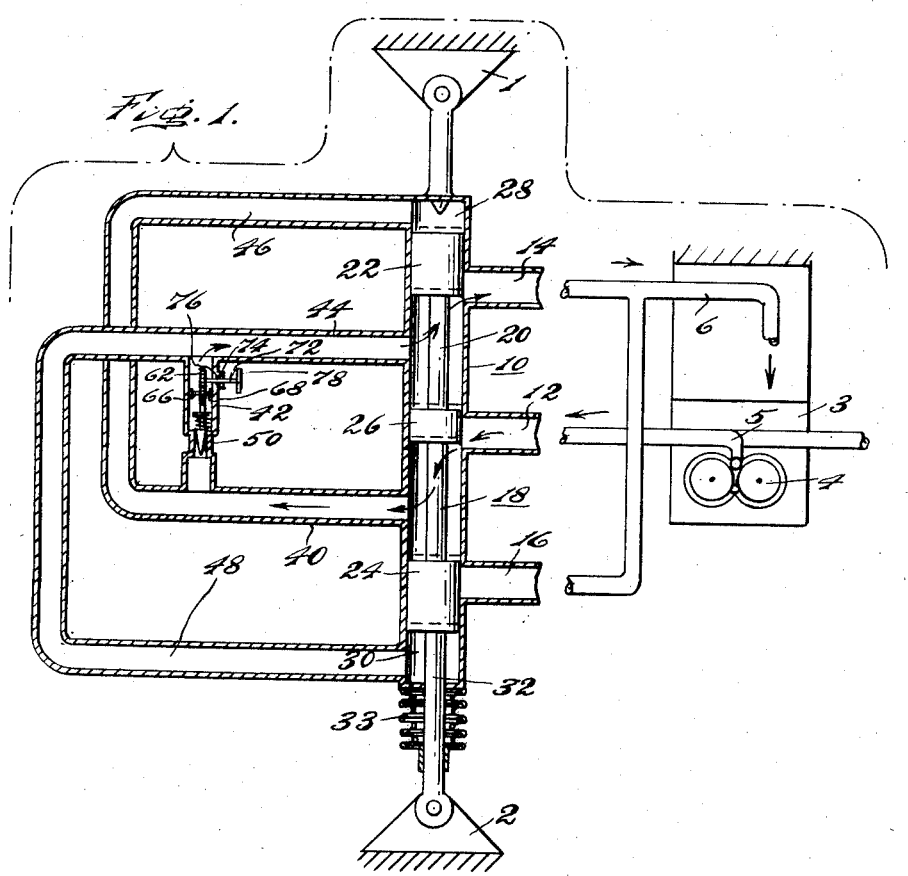
INVENTOR
Cyrus Beck
BY
Frank H. Borden
ATTORNEY United States Patent Office 2,861,794
Patented Nov. 25, 1958

2,861,794

HYDRAULIC SPRINGS

Cyrus Beck, Philadelphia, Pa.

Application July 27, 1955, Serial No. 524,725

3 Claims. (Cl. 267—2)

This invention relates to hydraulic springs by which relative motion in either sense between complemental relatively movable parts can be elastically absorbed and damped and the parts returned to a datum load relative position by fluid pressure flow from an extraneous source.

It is among the objects of this invention; to improve the art of springs; to provide a hydraulic spring for insertion between relatively movable work parts and for communication with a fluid pressure line and a sump; to provide a hydraulic spring with two relatively movable components having no metallic interconnection and in which any relative motion of the components is heavily but adjustably damped; to provide a hydraulic spring which cannot be broken or deformed and the force gradient of which is easily adjusted for any requirements; to provide a hydraulic spring of continuously variable force gradient by a control disposed externally of the spring; to provide a hydraulic spring the elastic action of which can be varied at will even during relative motions of the respective work elements between which the spring is disposed; to provide a hydraulic spring whose spring constant range may be made large or small with no disassembly of parts; to provide a hydraulic spring whose force gradient adjustment range depends only on a fluid pressure; and other objects and advantages will become more apparent as the description proceeds.

In the accompanying drawings forming part of this description:

Fig. 1 represents a partially schematic fragmentary section through the spring of the invention and the source of fluid pressure supply therefor, in mounted disposition between complemental relatively movable work elements showing in full lines an illustrative possibly exaggerated relative arrangement of the parts incident to elastic support of a given load and in dotted lines a transitory secondary setting incident to a purely illustrative acceleration force in the line of gravitational force of the load.

Fig. 2 represents a fragmentary enlarged section through the variable orifice valve and its adjusting means, partially in elevation, by which the hydraulic spring constant can be predetermined and varied.

The spring is for usually pivoted anchorage between a first work part 1, and a second work part 2. The parts are susceptible to relative motion toward and away from each other. In a purely illustrative case let it be assumed that work part 1 represents some portion of the chassis or body of an automobile, and work part 2 represents a complemental relatively movable portion thereof, such as the axle. In this illustrative case the hydraulic spring of the invention would be used in lieu of the metallic springs of the prior art. Because of its heavy damping it would also obviate the necessity for the conventional shock absorbers of such art. In any case there is provided somewhere, and in the case of the automotive installation, preferably on load part 1, a fluid sump 3, and a pump or accumulator 4 in communication therewith which is continuously driven during the operation of the work. The pump 4, purely illustratively a gear pump, is driven by a source of power (not shown). The power source in the illustrative case is the automotive engine, and the pump 4 forces pressurized fluid through a pressure tube 5. In the automotive case the tube 5 may constitute part of the full or partial force feed lubrication system of the motor. A return line 6 is provided, discharging into the sump 3. It will be obvious that the pressurized fluid supply and return, respectively, may be from and to any other desired powered agency.

It will be understood that the spring of the invention is a separate assembled entity, to be manufactured as such, for ultimate operative association with a first work part 1, a second work part 2, a fluid pressure supply 5, and sump or like return line 6.

The hydraulic spring of the invention, is comprised of a hollow body 10, for pivotal attachment to work part 1 (or 2 for that matter), as one component. As the hollow body 10 mounts the conduit-duct system to be described, and is for connection to the extraneous fluid pressure supply and return, usually associated with the upper load work part 1 (in the automotive illustration), the necessity for flexible connections between the hydraulic supply and the body 10 is obviated by connecting the hollow body 10 to the same work part that mounts the power supply. As noted, the body 10 may be pivotally connected to the work part 2 spaced from the power supply. The second working component of the spring comprises a rigid or solid member 18. Rigid member 18, comprises a relatively elongated stem 20, including a shank terminal extension 32, for preferably pivotal engagement with the work part 2.

The hollow body 10 has a generally median pressure inlet 12, and exhaust or sump-venting outlets 14 and 16, spaced on respectively axially opposite sides of the pressure inlet 12. Inlet 12 and outlets 14 and 16 are all in communication with the interior of the hollow body. In the manufactured entity, these may all comprise ports or apertures to which ultimate tubular connections may be established. The relatively solid and preferably integral rigid component 18, is provided with a first terminal combined valve and piston head 22, at one end of the stem 20, and a second terminal combined valve and piston head 24, between the stem 20 and the extension shank 32 thereof. A median valve head 26, usually of smaller axial extent than heads 22 and 24, is mounted on stem 20 between the terminal heads. The rigid component 18 is slidably disposed in the body 10, and in the generally centered disposition thereof therein valve piston head 22 closes exhaust outlet 14, the median valve head 26 closes the pressure inlet 12, and the valve piston head 24 closes exhaust outlet 16. An opening is formed at one end of the hollow body 10 in and through which the shank 32 of the solid component is slidable. A bellows seal 33 seals the shank 32 to the adjacent end of the hollow body, while permitting relative axial motions of the respective components.

Before discussing the conduit-duct organization of the hollow body 10, it is to be noted that the space between the outer face of the valve piston head 22 and the end of the body 10 comprises a pressure chamber 28, while the space between the valve piston head 24 and the other end of the body 10 comprises a pressure chamber 30.

The interior of the hollow body 10 has communicating with it a primary conduit 40, intermediate the inlet 12 and the exhaust or venting outlet 16, and a second primary conduit 44 intermediate the inlet 12 and the exhaust or venting outlet 14. A duct 46 communicates with the pressure chamber 28, at one end, and to the outer end of the primary conduit 40, at the other end. A second duct 48 communicates with the pressure chamber 30, at one end, and to the outer end of primary conduit 44, at the other end. A cross-channel or pressure-drop tube, 42, establishes a cross connection between primary conduits 40 and 44, inwardly of the duct connections at the respective outer ends thereof. Cross-channel 42 permits cross-flow between the primary conduits in a direction determined by the selection of primary channel to receive fluid under pressure from inlet 12 as a preponderating pressure, over that in the unselected conduit. An important feature of cross-channel 42, is the presence therein of a restricted orifice or constriction 50, so as to establish a pressure drop in the flow across the cross-channel, in either direction of its flow. The constriction 50 is adapted to be adjusted by a valve 52, which may be of any design capable of varying the size of the orifice and hence the resistance to fluid flow. This adjustment varies the spring constant to cause it to comport with instant load situations. An illustrative but presently preferred embodiment is the needle valve organization indicated in Fig. 1. This is best shown in the Fig. 2 fragmentary enlargement.

The needle valve 52 is reciprocable within the orifice 50 in cross-channel 42. A stem 56 extends from the valve 52 and is surrounded by the spiral spring 58, positioned between the wall surrounding the upper end of the orifice 50, and a washer 60, formed or mounted on the stem 56. A rack 62 extends from the stem 56 and is adapted to be actuated by a pinion 64, mounted on a shaft 66, journalled in bearings 68, mounted on the inner wall of the cross-channel 42. A gear 70 is mounted on a shaft 72, which extends through a bearing 74, and through an opening in the channel 42. A sealing ring 76 surrounds the shaft 72 in the opening. A wheel 78 is mounted on the shaft 72 outwardly of the cross-channel for the purpose of manually or automatically adjusting the position of the needle valve in the orifice.

With the parts assembled as schematically indicated in Fig. 1, it will be seen that with the rigid component 18 centered in the hollow component 10, the inlet 12 is cut off by the valve head 26, and both outlets 14 and 16 are respectively cut-off or closed by the respective piston valve heads 22 and 24.

Let it be assumed that the rigid element 18 is displaced from the centered relation relative to the hollow body 10 to a maximum degree, say in the direction tending to substantially close the pressure chamber 28, as for instance when the power is shut down, at the end of the day. As the load is no longer supported, as will be explained, the force thereof pushes parts 10 and 18 together at the upper end. At such maximum displacement, let it be assumed that the valve head 26 has been so displaced as to fully open the inlet 12 to the interior of the body 10. Simultaneously the valve piston head 22 has opened the exhaust outlet 14 to its fullest extent. When the fluid pressure flow is started, it passes through inlet 12 and into primary conduit 40. This develops a full head of pressure on primary conduit 40 which takes two courses. One is across pressure drop tube 42, and the other is into the pressure chamber 28, which starts to build up a dynamic head of pressure in the latter to develop an actuating force against the valve piston head 22 tending to move the rigid element 18 outwardly in the hollow body. With pressure in conduit 40, as noted, there is also cross-flow through channel 42 to conduit 44. But, any fluid under pressure moving through the cross-channel 42 and across the orifice 50, suffers a pressure drop. The lower pressure thus established in conduit 44, while being incident on pressure chamber 30, through duct 48, is also directly incident on the wide open outlet 14, and back pressure in the pressure chamber 30 is nil. At this juncture therefore a full head of pressure in pressure chamber 28 develops a force on the valve piston head 22 of the rigid element, which is substantially unopposed by force on the valve piston head 24 from pressure chamber 30. The low pressure on the outlet end of cross-channel 42, at 44, simply vents to sump.

In response to the force on the valve piston head 22 of the rigid element the latter begins to move outwardly of the hollow member. This motion simultaneously begins to close both the inlet 12 and the exhaust outlet 14. The low pressure flow at the primary duct 44 begins to build up pressure in the pressure chamber 30 and starts to develop force on the valve piston 24 in opposition to the force on the head 22, as the freedom of exhaust flow of the low pressure fluid to sump begins to be restricted by shutting off the exhaust outlet 14. The dynamic head of pressure in the pressure chamber 28 supports the load on work part 1 toward part 2, which is fully assumed and a balanced condition is established with further axial motion of the rigid element 18 outwardly of the hollow body component at which the inlet opening 12 is nearly shut off by valve head 26, and the exhaust outlet 14 is nearly shut off by the valve piston 22. At this point the pressure in opposing pressure chamber 30 has built up, from the low pressure side of the orifice 50, to such a degree that its force on the rigid element plus the gravitational force of the load just equals the force in the opposite pressure chamber 28. This is the load supporting relations of the parts generally indicated in full lines in Fig. 1. Fluid is now flowing from the pressure source to the sump as indicated by the arrows, and the load is "sitting" on the hydraulic spring.

Any disturbance due to an accelerating force in the line of the load force compounds with same to change the volumes of the respective pressure chambers as purely illustratively indicated in the dotted line head positions of Fig. 1, forcing fluid out of pressure chamber 28 and through the cross channel into the low pressure side of the constriction, at a rate determined by the spring constant set by the area of the orifice 50, part of which moves into the momentarily enlarged pressure chamber 30, while the remainder passes out into the sump through the momentarily enlarged opening of exhaust 14. When the acceleration has been elastically checked, the fluid pressure supply again brings the system back to the equilibrium state, with a steady pressure flow into the spring and out to sump. If the acceleration is in the opposite sense, against the load, momentarily pulling the rigid member outwardly, this is elastically absorbed by the oil in pressure chamber 30, forcing some excess into duct 48 and through primary conduit 44. As instantaneously, exhaust 14 has been moved more closed a high pressure is in conduit 44. This flows through pressure drop tube 42 and into pressure chamber 28 to build up an opposing pressure therein to assist in damping and absorbing the acceleration. This is aided by the momentary reduction in the inlet opening 12. Finally the parts will have been moved back to the equilibrium condition, in which the load "sits" on the hydraulic spring.

It will be seen that the hydraulic spring of the invention is heavily damped and takes the place of conventional shock absorbers. It will also be seen that the spring constant is variable and is determined by the area of the orifice 50 in its various adjustments. It will be clear that the adjustment of the spring constant may be made either manually, or automatically by motorized means as a function of variable conditions to which it may be desired to relate the elastic intensity.

It is believed that the advantages of the invention will be manifest, as will the fact that many changes in and modifications of the invention may be made without departing from the spirit thereof.

I claim as my invention:

1. A hydraulic spring for operative association between two relatively movable work parts and with a source of fluid under pressure, comprising a hollow body component for mounting on one such part and a rigid component slidable in said hollow body and for mounting on the other such part, said body having an inlet for communication with such source of fluid pressure and two exhaust outlets, said rigid component having three axially spaced aligned heads, the respective end heads sealing and unsealing the respective exhaust outlets and forming with the hollow body, oppositely disposed pressure chambers, and the intermediate head sealing or opening the inlet, a primary conduit communicating with the body between the said inlet and one of said outlets, a duct extending between the outer end of said primary conduit and one of said pressure chambers, a second primary conduit communicating with the body between the inlet and the other of said outlets, a second duct extending between the outer end of said second primary conduit and the other of said pressure chambers, and a cross-channel between the respective primary conduits having a constriction.

2. A hydraulic spring as recited in claim 1, and means for varying the constriction.

3. A hydraulic spring for operative association between two relatively movable work parts and with a source of fluid under pressure and a sump, comprising a hollow body component for mounting on one such part, and a rigid component slidable in said hollow body and for mounting on the other said part, said hollow body having inlet and outlet means for communication with such source of fluid pressure and said sump respectively, said hollow body and said rigid component together defining opposing pressure chambers in said hollow body effective between the hollow body and said rigid component, plural conduit means communicating with said hollow body and with the respective pressure chambers therein, pressure-drop-effecting means disposed between the plural conduit means, means responsive to the relative positioning of said hollow body and said rigid component selectively controlling the communication of said inlet and outlet means with said respective plural conduit means and controlling the pressure drop across said pressure-drop-effecting means and thus the respective pressures in said pressure chambers.

References Cited in the file of this patent

UNITED STATES PATENTS

| | | |
|---|---|---|
| 864,141 | Scott | Aug. 20, 1907 |
| 1,291,016 | Kellogg | Jan. 14, 1919 |
| 1,861,821 | Schaum | June 7, 1932 |
| 1,974,171 | Bizzarri | Sept. 18, 1934 |
| 2,166,956 | Kollsman | July 25, 1939 |

FOREIGN PATENTS

| | | |
|---|---|---|
| 1,087,913 | France | Sept. 1, 1954 |